June 10, 1930.  F. J. SPRAGUE  1,763,198
DUAL ELEVATOR SYSTEM AND CONTROL
Filed Dec. 31, 1926    7 Sheets-Sheet 1

Frank J. Sprague
INVENTOR.
BY Dorsey & Cole
ATTORNEYS.

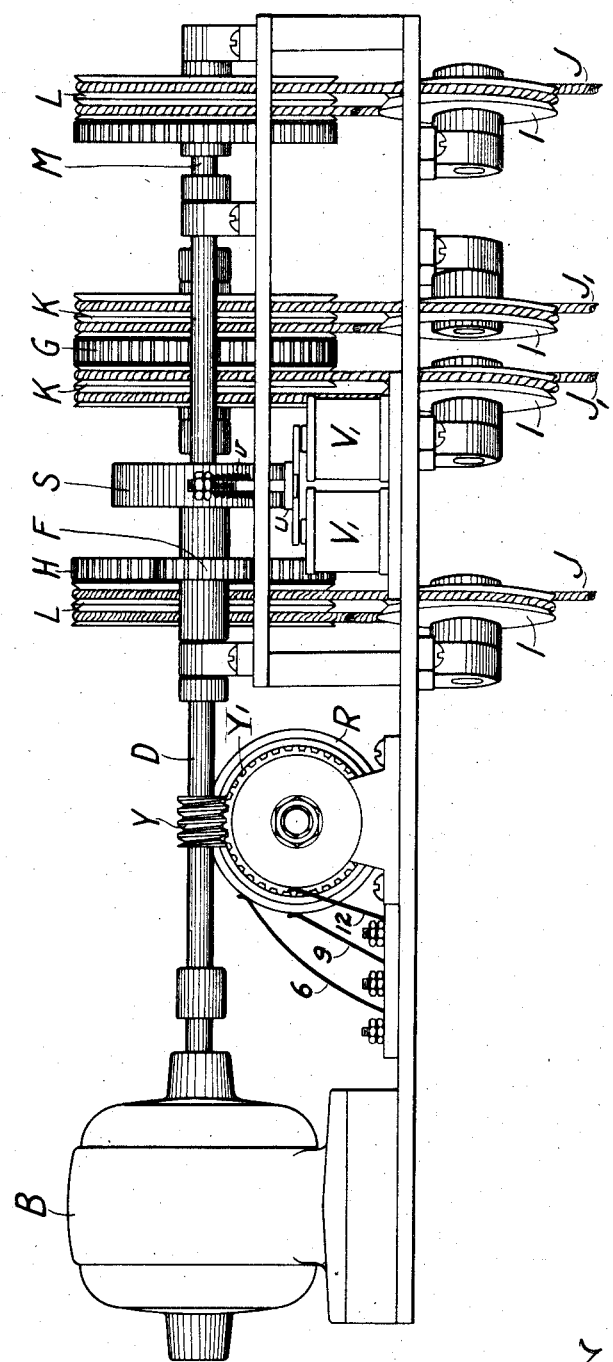

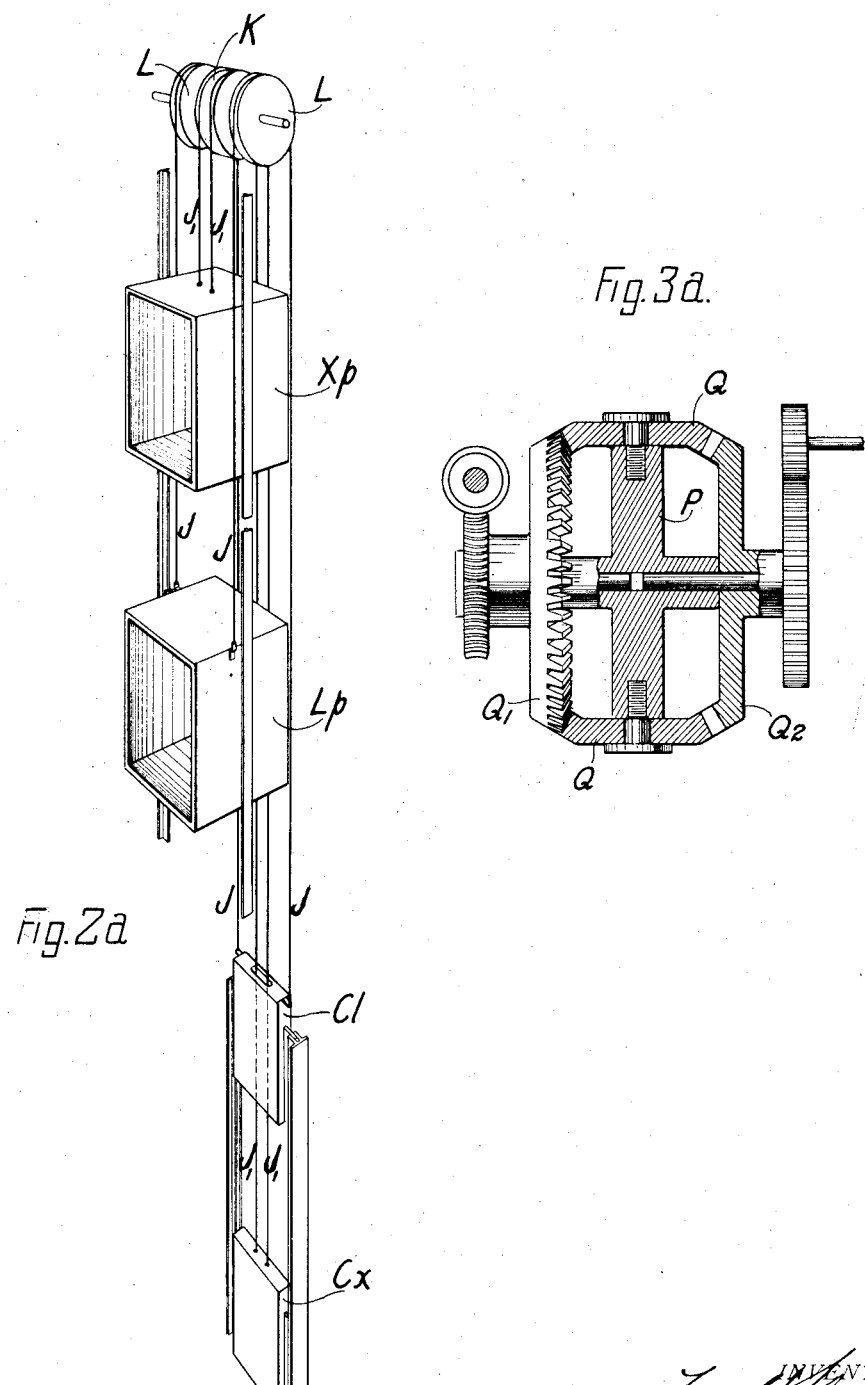

June 10, 1930.　　F. J. SPRAGUE　　1,763,198
DUAL ELEVATOR SYSTEM AND CONTROL
Filed Dec. 31, 1926　　7 Sheets-Sheet 6

*INVENTOR.*
BY
*ATTORNEYS.*

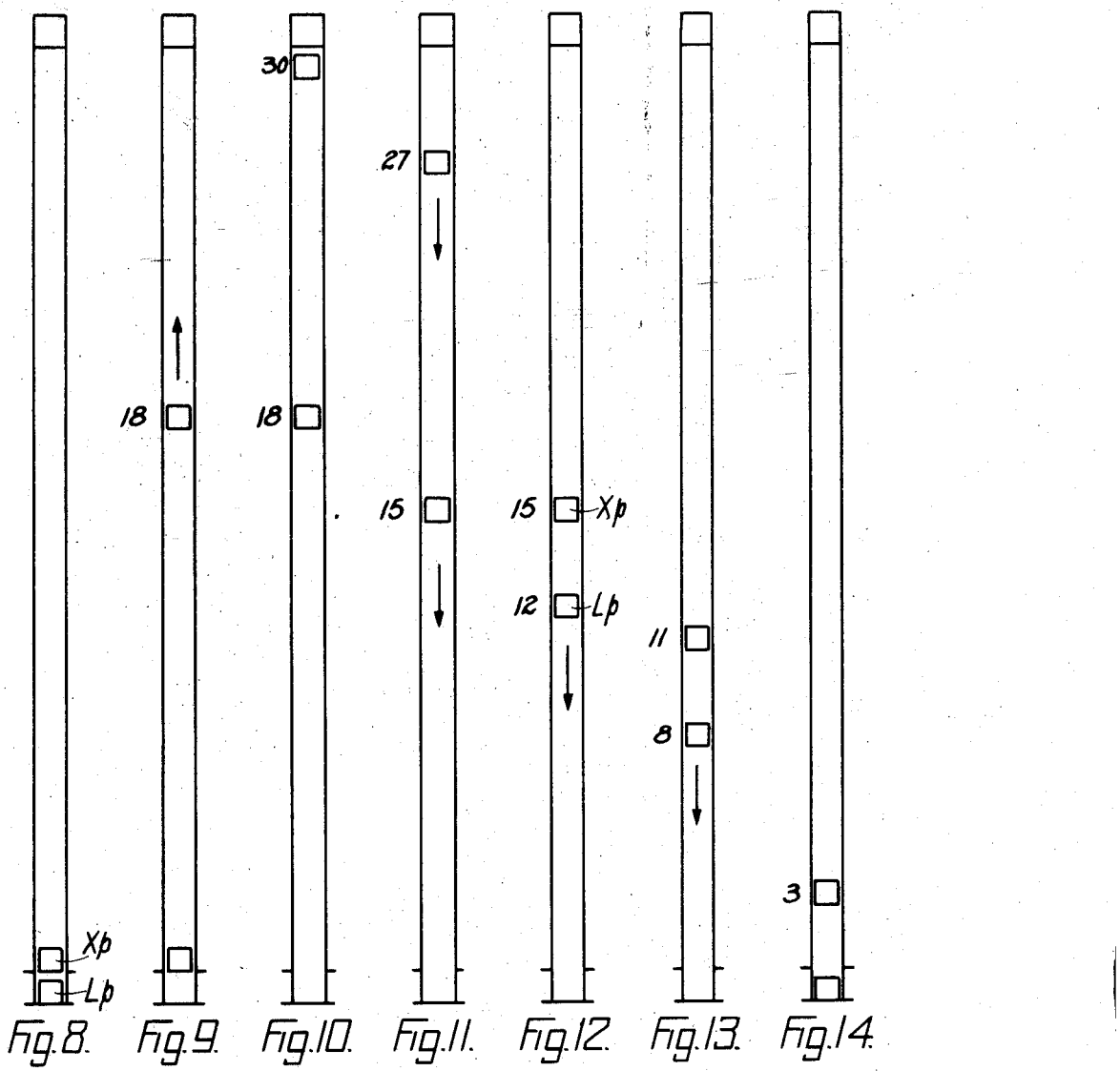

Patented June 10, 1930

1,763,198

UNITED STATES PATENT OFFICE

FRANK J. SPRAGUE, OF NEW YORK, N. Y., ASSIGNOR TO WESTINGHOUSE ELECTRIC & MANUFACTURING COMPANY, A CORPORATION OF PENNSYLVANIA

DUAL ELEVATOR SYSTEM AND CONTROL REISSUED

Application filed December 31, 1926. Serial No. 158,244.

My invention has for its object an increase in the economical equipment and operation of high buildings, with consequent simplification of floor lay-outs, by a concentration of elevators in more limited space than now usually occupied, with resultant increase in available rental space, of an annual value amounting in typical instances of existing buildings to large sums, as will be specifically illustrated later.

In buildings of this character the elevator service is divided. In some, local service is provided from a basement or main floor to some floor intermediate between the main and upper ones, stopping at all intermediate floors, and express elevators to the upper limit reached by the local service, or the floor above, with local service beyond that to the top floor.

A building with the elevator service thus divided may be regarded as a composite of two buildings, one on top of the other, the lower provided with an elevator service stopping at all floors, and with its shafts not extended into the upper buildings, and the upper sections with an elevator service likewise stopping at a limited number of floors, but with the shafts extending downwards through the lower section. In such buildings it is evident that much valuable space is sacrificed throughout all floors except the main floor of the lower unit solely for access to the upper one by elevators having no operative function and serving no useful purpose in the lower unit except at the ground floor.

In other buildings the elevator service may be divided into three or four heights of run, each locally serving a fifth or a quarter of the floors. In such cases, at least the space below the first stop in any elevator, and above the lower landing, is taken away from otherwise useful space, and if an elevator is stopped short of its maximum run then the space above the last stop is also wasted.

The increasing height and capacity of buildings due to special demands and to the increased cost of land—all impelled by the demands of competitive investment,— and certain limitations imposed by law or by the requirements of light and ventilation have steadily increased the cost of elevator equipment and the waste of non-rental space imposed thereby.

To reduce this waste there has been an increase in the running speed of elevators, supplemented by various devices for automatic stopping and levelling at floors regardless of accurate operation by the operators, but there is a definite limit to the economical speed at which elevators may be operated, and also to the gain which may be made by automatic stopping and floor levelling devices.

My invention purposes to reduce the waste of space, by installing and operating on the same rails a pair of elevators in a common shaft, using common or separate counterweight rails for both elevators, any shaft being thus available for elevators running from the main floor to supply local service to two different floor zones, with express service to the lower floor of the upper zone. I also provide means of control such as will permit each elevator to be operated with entire freedom as regards the other except when approaching within a predetermined distance of each other, whether such approach be the result of one car being run towards the other at stop, or one overtaking the other when moving in the same direction, or both in motion towards each other.

Manifestly, this result can only be accomplished by providing a control for approach movements of the elevators which shall be interlocked with the movements of both elevators, which shall establish a limited zone of approach regardless of its relation to floor location, and which is responsive to both direction, distance and rate of movement of each of the elevators.

In other words, if a slow-down zone covering, say, three floors and a stopping zone covering one floor are the established limits, then, when the lower car comes within three floors of the upper, or the upper within three floors of the lower, the moving car or cars must automatically slow down, and when within one story distance must stop, regardless of the location of the cars relative to the various landing floors.

The control zone, therefore, must be a floating one, shifting automatically from floor to floor, at one time covering, for example, the first, second and third floors, and at another, say, the fifteenth, sixteenth and seventeenth floors,—in fact, any group of three floors, wherever situated, within the prescribed common runs.

In all normal present elevator operation slow-down and stop limits are provided at each end of the run, these being known as the upper and lower limits. Regardless of what other control be added to a dual elevator operation, it is evident that the upper elevator must have the regular up limit and the lower elevator must have the normal low limit. The lower elevator may also, but not necessarily, have a fixed upper limit.

But it is equally clear that each elevator must also have a floating limit, a low one for the upper elevator and an up one for the lower elevator, each of these limits being automatically variable and determined equally by the movements of each. That is, the limit of up travel for the lower elevator and the limit of down travel of the upper elevator are determined by the shortening of the distance between the elevators to the predetermined zone or distance regardless of floor relation or whether one or both elevators are in motion.

There is, therefore, provided in my system a fixed up limit for the upper or express elevator, a fixed low limit for the lower or local elevator, with or without a fixed up limit for the latter, and a floating low limit for the upper elevator and a floating up limit for the lower one,—these floating limits being automatically determined by the relative movement and proximity of the elevators themselves, whether by movements of the elevator driving mechanisms, the overhead or idler sheaves, or sheaves driven by the car cables, or by running cables attached to and moving with the elevator cars.

Evidently, the motion of the interconnected and co-related governing parts,—each corresponding to the actual movement of its corresponding elevator, these two governing the differential control of the variable limits,—must coordinate in time, rate and amount of movement of the elevators, unaffected by any slip of cables on the driving sheaves.

The construction of the electric mechanism, the suspension of the cars, and the speeds and loads individual to operation are factors which determine what shall be the actual method of physical connection and construction of the floating zone control mechanism.

While modifications are possible in detail construction of apparatus, the method I propose and have put in operation in an operative equipment provides a differential control of the circuits governing the down movement of the upper elevator and the up movement of the lower elevator, this control being made possible by carrying these specific circuits through a floating mechanism, like a jack-in-the-box combination, the common circuit controlling member being carried on a spindle engaged through free mitre or bevel gears with a pair of driving gears, one on each side, each driven in synchronism with the corresponding elevator.

Such a combination may be likened to the reverse of the differential driving mechanism on the rear axle of an ordinary motor car, in which there is—on either side of the center,—a mitre or bevel gear connected to the driving shaft of the corresponding rear wheel, and an intermediate floating spider with gears meshing with the motor shaft gear. If the motor car is lifted up either wheel may be turned while the other is held fast, in which case the spider will turn in the same direction as the running wheel at half the angular velocity. If the wheels are turned in opposite directions then the spider will have a differential motion, being anything from zero to near half speed in either direction, depending upon which wheel turns faster, but if both wheels are turned in the same direction the spider will have a differential speed varying from one-half to full angular velocity, depending upon the rate and relation of the two speeds.

So in the elevator control mechanism I have invented, the differential member will move fast or slow in one direction or other, or stop, depending upon the direction and rates of movement of the two elevators. But one thing is especially to be noted, and that is, that the two initial drives are so arranged that up movement of the lower elevator and down movement of the upper elevator will move the differential member of the control mechanism in the same direction, to a slow-down and then to a stop position.

Of course, the elevators are at all times free to move in directions away from each other, no matter how close they may be, and cars may also move with entire freedom up or down, within normal extreme limits, when removed from each other by more than the limit of the floating zone; and each elevator may also move slowly towards the other to stop in the floating control zone.

In addition to the control of the elevators, various practical physical problems exist for which provision must be made.

The first of these relates to the lower landing stops and the car suspensions. The preferable plan is to have the express elevator start from the main floor and begin its local stops at the nth or nth-plus-one floor, and to have the local elevator start from the basement or sub-basement, with stops at all floors, including the main, to, say, the nth floor, its upper run being ordinarily limited to such floors as will best meet the joint operation. Of course, each elevator may have its control interlocked with the landing doors on the floors which it serves, and such control may be eliminated or be specially arranged at the first or main floor.

The cars may—and preferably should—be run on the same rails, and the counterweights may be run on the same or different counterweight rails. If on the same rails the counterweight for the express elevator would be the lower. The suspensions may be varied, the express having center cable fastenings and the local side fastenings, although both may have side fastenings.

The usual car safeties may be used, such as the normally locked mechanisms released at an excess speed, whether because of loss of control or broken cables or fastenings, through a running rope fastened to the car with a locking centrifugal at the head of the shaft. Or, and preferably, a combination of initiating of safety means,—one depending upon speed and the other local to the car and dependent upon rate of acceleration, which will form the substance of another patent application.

In laying out the floor plans of some types of buildings, the halving of the number of elevator shafts makes for simplicity, as all shafts may be run through the full height, landings may be provided at all floors, the floor plans as regards windows and spaces available for offices may be made identical, and the elevator service be made far more flexible to accommodate changes in occupancy or seasonable or hourly change in requirements.

The drawings and description of particular mechanisms are simply typical, and are not intended as a limitation upon the application of the general principle of construction and operation of my method of dual control of elevators in a common shaft.

Referring to the accompanying drawings, in which corresponding parts are designated by like marks of reference.

Fig. 2a shows the roping or cabling scheme for support of the two elevators, the upper elevator being supported by center positioned and anchored cables and the lower elevator by side positioned and anchored cables, the reversed arrangement of the counterweights when run on common rails and the method of leading the cables to the counterweights.

Fig. 3 shows a side elevation of the lower or local elevator motor, its driving shaft, the traction sheaves and driving gears for both the upper and lower elevators, the idlers below the traction sheaves, the electric brakes on the driving shaft of the lower elevator motor, and the worm gear drive of one end of the differential limit controller.

Fig. 3a shows a typical physical construction of the differential gear drive for the variable limit controller for the up control circuit of the lower elevator and the down control circuit of the upper elevator, regardless of the particular physical means of driving each primary part.

Figs. 8 to 14 are diagrammatic illustrations of the variable relation of two elevators operated in a common shaft at fixed minimum approach distances.

Figure 1:
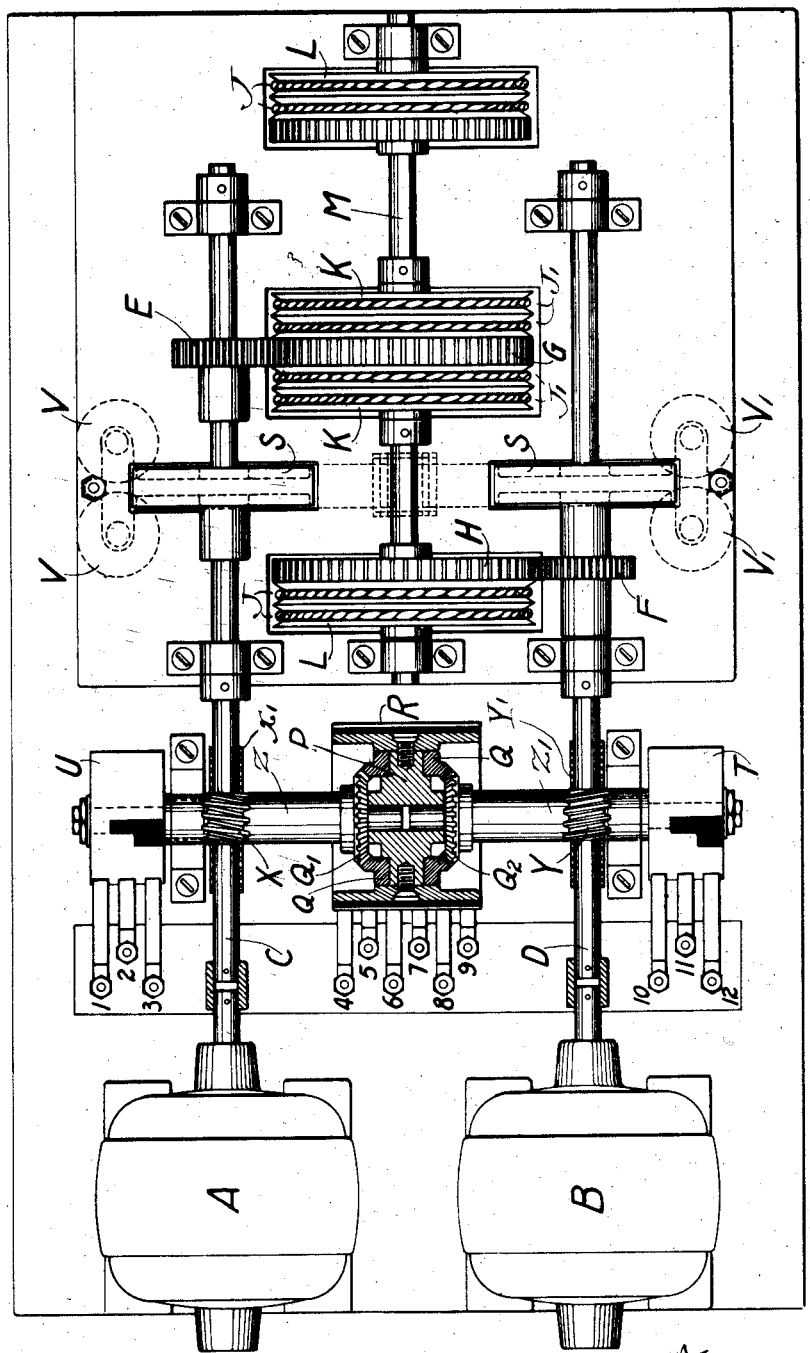
Fig. 1 shows a plan view of two elevator operating motors, the driving shafts thereof, traction sheaves driven thereby, and three limit switches, namely, the up limit circuit controller for the upper elevator, the low limit circuit controller for the lower elevator, and the common differential controller for the shiftable variable of both elevators.
Figure 2:
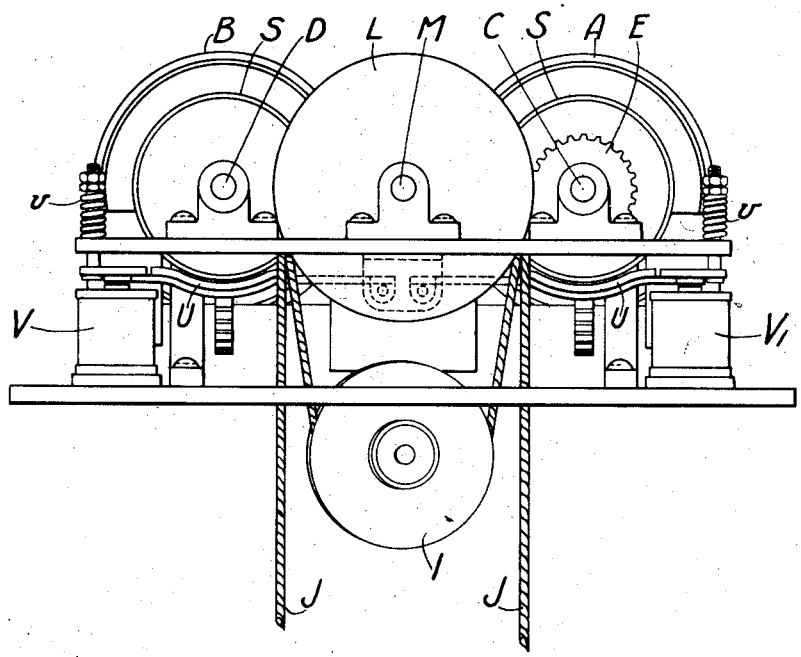
Fig. 2 shows an elevation of the two motors and of the center or express traction sheaves, the corresponding idler sheaves, and the electric brakes on the two motor shafts.

Referring to Figs. 1, 2 and 3, which show plan, end and side views of two traction drive elevator motors at the top of a shaft and, for convenience, a method of gear drive of the traction sheaves, A is the driving motor for the express elevator and B the driving motor for the local elevator.

The shaft of motor A is connected through a coupling to shaft C, which carries a worm X, meshing with a worm gear beneath it, and is extended through supporting bearings to carry a brake wheel S and a pinion E, meshing into drive gear G. Secured to this drive gear, on each side, is a pair of friction drive traction sheaves K, K, over which the cables carrying the express car and counterweight are carried with what is known as a double wrap, the cables J from the car being first carried over one pair of sheaves, then around idler sheaves I supported below the traction drive sheaves and shown in detail in Figs 2 and 3, and then again over the remaining pair of traction drive sheaves K, and on down to the counterweight.

Similarly, the shaft of motor B, that which operates the local or lower elevator, is coupled to a shaft D, which is extended, through suitable bearings, to carry a worm Y meshing with a worm gear beneath it, a brake wheel S, and a pinion F which engages the driving gear H, rigidly connected to the shaft M.

Fastened to the driving gear H is a pair of friction traction drive sheaves which carry one-half of the supporting cables of the local elevator, while to the shaft M is secured another pair of traction sheaves for the other half of the cables of the local car.

Shaft M is carried by and turns in bearings at each end, and upon the same shaft and freely journalled upon it, for convenience, is carried the driving gear and sheaves for the express elevator.

The cables for the local car are rove in the same fashion as those for the express car, with double wrap, the loop being carried around individual idler sheaves mounted below the friction drive sheaves. The object of this double wrap is to increase the friction grip, and to reduce the chance of slip at starting and stopping.

The system thus shown is one which, with certain proportions and dispositions of loads and weights of cars and counterweights is in a balanced condition, and will thus operate with a minimum expenditure of power. In regular operation, however, the balance of load shifts, sometimes being in excess on the car side and at other times on the counterweight side, and, hence, with a suitable motor current will sometimes be taken from, and at other times be delivered to the supply source.

Fig. 2a, which is inserted for illustrative purposes only, since the subject matter thereof forms no part of my invention, shows the actual relation of the two cars Xp and Lp and their respective counterweights Cx and Cl when the two latter are run on the same rails, one above the other. In this diagram the driving motor and gears are omitted, as well as certain other features, such as the idlers, shown in Figs. 1, 2 and 3, the object being simply to show the reverse position of the counterweights when compared with the cars, and the particular method of leading the cables.

In order to get proper travel without interference the side anchored cables of the local or lower car Lp are secured to the two sides of the upper counterweight Cl, and the center anchored cables of the express or upper car Xp are secured to the center of the lower counterweight Cx, these cables passing through an opening in the center of the upper counterweight Cl.

On each driver shaft is a brake wheel S, normally pressed, when the operating circuit is broken, by a friction shoe $u$, held against the brake wheel by adjustable spring $v$. When in operation, magnet V V being energized, the brake shoe is retracted and leaves the brake wheel and shaft unretarded.

The all important element of this combination of a pair of elevator mechanisms driving a pair of elevators in a common shaft is the provision for interlocking the movement of the cables and cars so that a normal minimum approach distance may be insured between the cars at all times, regardless of their relative location in the shaft. This is secured by a differential combination which controls a shiftable up limit for the lower or local car and a shiftable low limit for the upper or express car.

Fig. 3a shows a typical form illustrative of the differential mechanism which may be used in the supplemental limit controller. This comprises a control member, rotatable about a horizontal axle, and carrying on its radial arms P freely mounted mitre or bevel gears Q, shown in section. On each side is a mitre or bevel gear, one $Q_1$, shown full and the other $Q_2$ in section, meshing with the gears on the spider, which side gears rotate about the same axis as the latter. If one of the side gears is held fast, rotation of the other will rotate the spider in the same direction at half speed, its free gear being driven around the stationary one as a runway.

If both gears are turned in the same direction, the spider will turn more rapidly, and if both move at the same rate then the spider will turn at a like rate.

If, on the other hand, the side gears turn in opposite directions, the spider will either remain stationary, as when the speed of the side gears are alike, or take a differential motion of variable rate, one way or the other, according to the relative movements and speeds of the side gears.

It follows that if one of the side gears is driven by or in synchronism with one elevator and the other side gear is driven by or in synchronism with the other elevator, and the central member is made to control certain circuits, these circuits may be opened or closed according to the direction and amount of displacement of the contact spider as a differentiated result of the motion of two side drives.

In the figures gear $Q_1$ is shown, for illustration, driven by a worm gear and the gear $Q_2$ by a spur gear, but it is evident that any kind of a driving connection to the motor or motor loads may be used, and also that a variety of well-known circuit controlling contacts and opening and closing devices may be operated by the differential member without departing from the spirit of my invention.

As already stated, it is essential, to avoid the necessity of adjustment, that the prime motivating agencies operating this differential control shall be free from tendency to change the limit of approach distance between the two elevators in the event of any slip of cables on the driving sheaves, and hence it would best be operated from either the idler sheaves, which are largely free from slip, or friction sheaves driven by the cables, or by running ropes attached to and moving with the car. But where the duty is not too severe the differential may be driven from the elevator motors themselves, and for convenience of illustration this method is shown in Figs. 1–3.

In the middle space between the driving shafts is carried a jack-in-the-box, that is, a spider P, rotatable about a horizontal axis and having on its extended arms freely turning mitre or bevel gears Q, which are engaged on each side by suitable mitre or bevel gears Q—1 and Q—2. The first of these is carried on shaft Z, which also carries a worm wheel $X_1$, meshing with worm X, and hence is turned at a proportionate rate by the shaft of the express elevator motor A, while the latter is carried on shaft $Z_1$, which also carries a worm wheel $Y_1$, meshing with worm Y, and hence is moved at a proportionate rate by the shaft of the local elevator motor B.

On the outer end of one shaft is carried the fixed up limit contact cylinder U of the express elevator, and on the outer end of the other shaft is carried the fixed low limit contact cylinder T of the local elevator. The worm gear of one drive is right-handed and of the other left-handed, so that when the express elevator is moving down or the local elevator is moving up, the differential member is turned in the same direction, that is, to the contact breaking position. If both are moving in the opposite directions, that is, the express up and the local down, the differential is turned in the reverse direction, that is away from the contact breaking position.

Any change in direction, rate, or amount of movement of either or both of the driving members of the differential is reflected in varying fashion in the middle, or differential member, so that it will move one way or the other, fast or slow, and with any angular displacement up to the maximum, which must, of course, be less than a complete circle, in response to the variable motions of the elevators.

Resting on the fixed up limit contact cylinder U of the express elevator are brushes 1, 2, 3 and on the fixed low limit contact cylinder T of the local elevator are brushes 10, 11, 12, which provide a line contact supply and slow-down and stop limits, as shown and explained in Figs. 4–7.

Also, resting on the contact cylinder of the differential are six brushes 4, 5, 6, 7, 8 and 9, which, as also shown in Figs. 4–7, provide the necessary circuits for the shiftable down limit of the express elevator and the shiftable up limit of the local elevator, the contact cylinders being cut away in such fashion as to insure first a slowdown and then a stop, as shown in the figures referred to.

The distance between the elevators, which must not be encroached upon in normal operation, is determined by the meshing of the gears, in connection with the set of the fixed limits, and by the relation of the broken or stepped end of the contact cylinder R, to the contacts resting upon it. Hence, if the meshing has been determined for any given set of the fixed limits, then the approach distance may be changed by rotating the contact cylinder R about its supporting differential member.

Figs. 4–7 are diagrams of the dispositions of one type of control circuit in operating condition for effecting the control of two elevators in my dual system, with particular reference to the method of differential control of the shiftable upper limit of the lower elevator and the shiftable lower limit of the upper elevator, provision being, of course, made for the fixed up limit of the upper elevator and fixed low limit of the lower elevator, a fixed up limit for the latter, although it may be used, being omitted as unnecessary.

$Fa$ and $Fb$ are the field circuits of $Aa$ and $Bb$, the armatures of the express and local or upper and lower elevators, respectively, all supplied from a common source $+ -$.

To each armature are connected, respectively, the contact arms $o, o$, in movable engagement with the resistances $a, b, c, d$, and $p, p$ in movable engagement with resistances $e, f, g, h$.

At the top of each figure is shown the upper limit cylinder control switch U for the express elevator, and the down limit control switch T for the local elevator, while in the center is shown the differential control cylinder R of the shiftable floating low limit of the express elevator and the shiftable floating up limit of the local elevator,—all contact cylinders being developed in plan.

As shown in Figs. 1–3, each elevator mechanism moves its fixed limit switch U or T in the proper direction for cut-off through the worm gear driven shafts.

Through the same means are independently driven the two bevel or mitre gears Q—1 and Q—2, meshing with the gears Q carried on a freely movable spider P which supports the differential control contact cylinder R, with which engages the six brush contacts 4, 5, 6, 7, 8 and 9.

The edge of the developed contact differential contact cylinder is stepped so that its brushes break contact successively as the cylinder rotates, or when moved, as developed, toward the top of the diagram.

This control cylinder governs the shiftable approach limits, the contacts 4 and 5 on the left governing the shiftable low limit of the express elevator, and the contacts 7 and 9 on the right governing the shiftable upper limits of the local elevator.

The connections and physical drives are such that the differential cylinder R moves in the same direction, that is, as developed, toward the top of the diagram, when the express elevator is moving down or the local elevator is moving up, with the result that in a certain predetermined relative position of the elevators both sets of these contacts, controlling the respective limits of motion, are always broken, first at contacts 4 and 9 through resistances $k$ and $l$, to slow down the elevators, and then at contacts 5 and 8 to stop them.

The differential control cylinder R will move in one way or other, for variable distances, at angular speeds varying from the minimum to the maximum, or will stand still, according to the direction and rate of movement of the two driving gears Q—1 and Q—2, these being, as already stated, each independently driven by some part of its associated elevator equipment having a motion synchronous with the motion of the corresponding elevator car or car load. Such parts are, for example, the motor shafts, the traction sheaves, or any sheaves or shaft driven by the hoisting cables, as for example the idler sheaves, or by cable fastened to the car and moving with it, as used to operate the ordinary speed control governor.

The sole function of any of these drives is, through a proper ratio of gear reduction, to impart motion to the gears $Q_1$ and $Q_2$ synchronous with the motion of the cars, and thence variably to the differential member.

As shown in Fig. 1, the gears $Q_1$ and $Q_2$ are driven respectively through reduction worm gears $X_1$ and $Y_1$ and worms X and Y, by the shafts C and D of motors A and B, but it is evident that inasmuch as there would be no change in the differential action itself the gears may derive like motion by being driven from any shaft moved by or in synchronism with the movements of the cars.

These are all physical variants or equivalents, and admit of a great variety of construction. They also may find their equivalent in differential screws and nuts or other mechanical forms without departing from the spirit of the invention.

Figure 4:
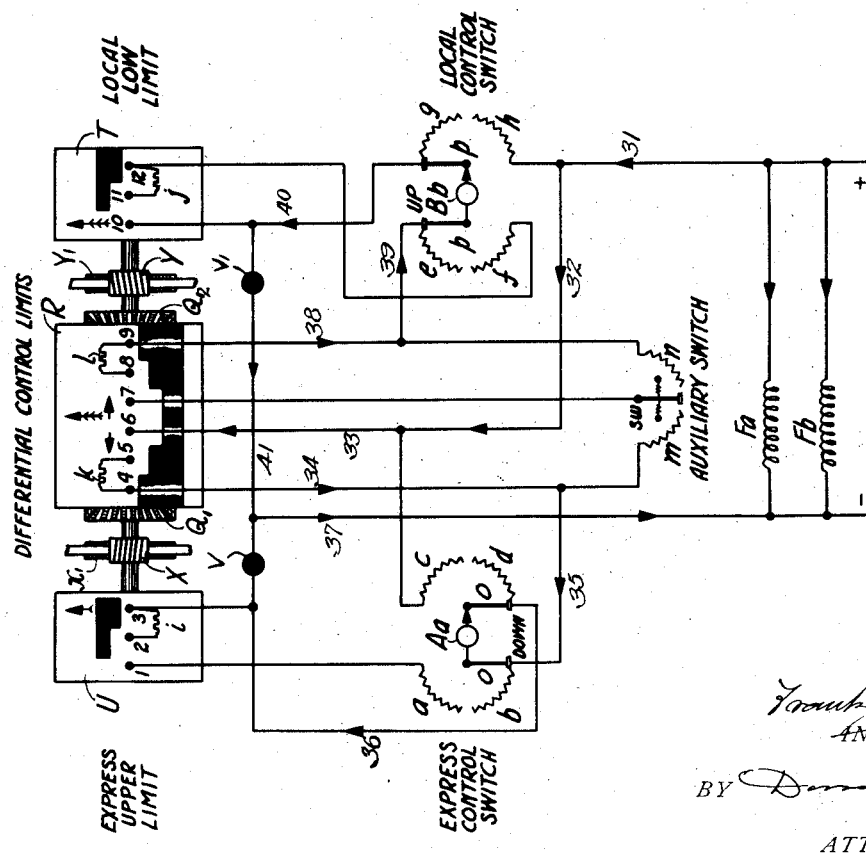
Fig. 4 is schematic diagram of the operating electric circuits and their relation to the limit switches, developed in plan, when the express or upper elevator is moving down and the local or lower elevator is moving up, that is, when approaching each other, and at full speed.

Referring to the figures in detail:

In Fig. 4 the control switches of the two cars are set for full down speed of the express and full up speed of the local elevator, and the paths of the circuits are as indicated by the arrows and enumerated numbers.

As already explained, the fixed and variable limit switches are shown at the top of the figure and in plan view. On the left is the upper limit switch contact cylinder U of the express elevator, from which a circuit-breaking section is cut away, and on which rests the main contacts 1 and 3, and contact 2 in circuit with a slow-down resistance $i$ when the contact first rests upon the insulating section of the cylinder. When the express elevator is moving down contact cylinder U is, by means of worm X in mesh with worm wheel $X_1$, rotated in the direction shown by the arrow, that is, away from the circuit-breaking position.

Similarly, on the right hand is shown the low limit switch of the local or lower elevator, with its main circuit contacts 10 and 12, and contact 11 in circuit with a slow-down resistance $j$ when the contact first rests on the insulating section. When the local elevator is moving up the contact cylinder T is, through worm wheel $Y_1$ and worm Y, rotated in the direction shown by the arrow, that is, away from the circuit-breaking position.

Figure 7:
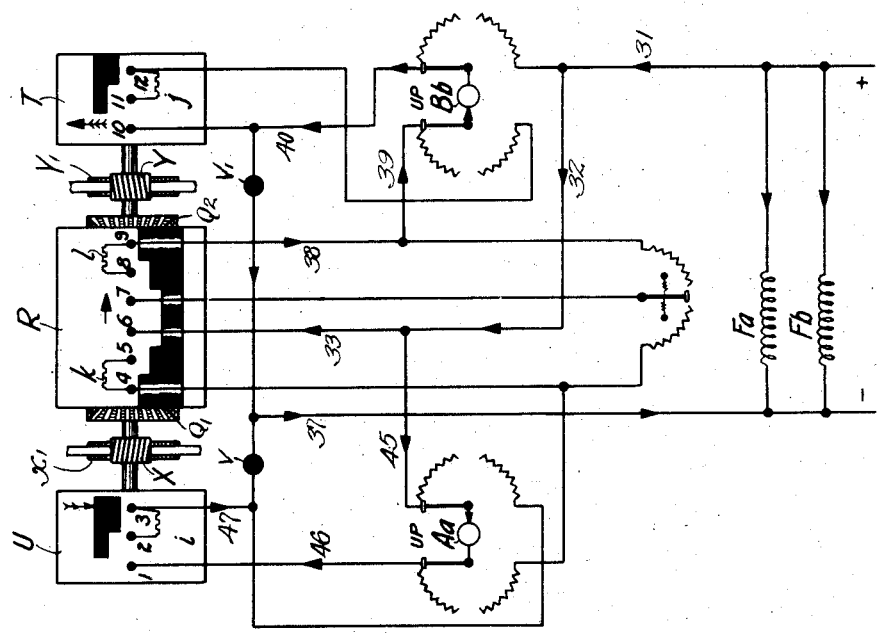
Fig. 7 is a schematic diagram of the operating circuits and their relation to the limit switches, developed in plan, when the express and local elevators are both moving up, also at full speed.

If the directions of motion of the two elevators are reversed, as indicated in Fig. 7, then the circuits of the motors are broken when the shaft limits are reached, slow-down resistance $i$ and $j$ first being thrown into circuit.

In the upper center of the diagram is shown the floating or differential control switch. This comprises a contact cylinder R, with a double stepped insulating section, on which cylinder rests the main and slow-down resistance contacts 4, 5 and 6 associated with the down control circuit of the express elevator and the main and slow-down resistance contacts 9, 8 and 7 associated with the up control circuit of the local elevator.

This contact or control cylinder is carried on the middle member of the differential controller, that is, the spider section with its freely mounted bevel or mitre gears at the outer ends of its arms, which mesh with the bevel or mitre gears $Q_1$ and $Q_2$ independently driven through their respective worm wheels and worms.

The motion of this cylinder is variable both in direction and rate. If the elevators are running in the same direction at like speeds the cylinder will remain stationary; if the speeds or directions of motion are different the cylinder will move one way or the other, fast or slow, according to the relative direction and speed of movement of the elevators; if they are approaching each other the cylinder will move at a faster rate, all contacts will be brought into engagement with the insulating section and both elevators will first be slowed down and then stopped.

This slowing down and stopping will result with either elevator if it only is moving to an approach limit, and at the same time the limit will be established for the elevator which has been stopped by the regular car control, so that it also can not be moved towards the other car.

Inasmuch as this differential control affects only the circuit in each motor which governs the approach of the elevators towards each other, it follows that the motors may be freely operated through the remaining control circuits in a direction away from the approach, until stopped by their normal limits.

In the middle part of the diagram there are shown the starting resistances $a$, $b$, $c$ and $d$ of the car controller O O for the express elevator armature $Aa$, and the starting resistances $e$, $f$, $g$, $h$ for the car controller TT of the local elevator armature $Bb$; also the circuits $Fa$ and $Fb$ of the two motor fields, and the auxiliary or supplemental control switch $Sw$, by which either elevator may be moved a short distance toward nearer approach after being stopped automatically.

Referring now to the detail circuits, in the express elevator the armature current flows from the plus source over circuits 31, 32 and 33 to contact 6 on the differential control cylinder R, thence across the surface of the latter to contact 4, shunting the slow-down resistance $k$, and thence over circuits 34 and 35 and arm O to armature $Aa$, through it, over circuit 36, through the electric brake coils V, and by circuit 37 back to the source, no part of the circuit passing through the upper express limit switch U.

The current of the armature of the local elevator likewise flows from the plus source over circuits 31, 32 and 33 to contact 6 of the differential control cylinder R, thence across it to contact 9, shunting resistance 1, and then through circuits 38 and 39 and arm $p$ to armature $Bb$, and through it via circuit 40, brake magnet coils $V_1$, and circuits 41 and 37 to the source, no part going through the low limit switch T.

In consequence, the differential cylinder moves at full angular velocity in the direction shown by the feathered arrow, and finally throws into circuit the resistances $k$ and $l$ by breaking contacts 4 and 9, and then, on further movement, breaks both circuits at contacts 5 and 8, thus first slowing down and then stopping each elevator at the predetermined distance from the other.

If either elevator is stopped the differential control cylinder will move at half angular velocity of the driving gear Q—1 or Q—2 to effect the slowing down and stopping of the moving elevator at the predetermined distance.

Figure 5:
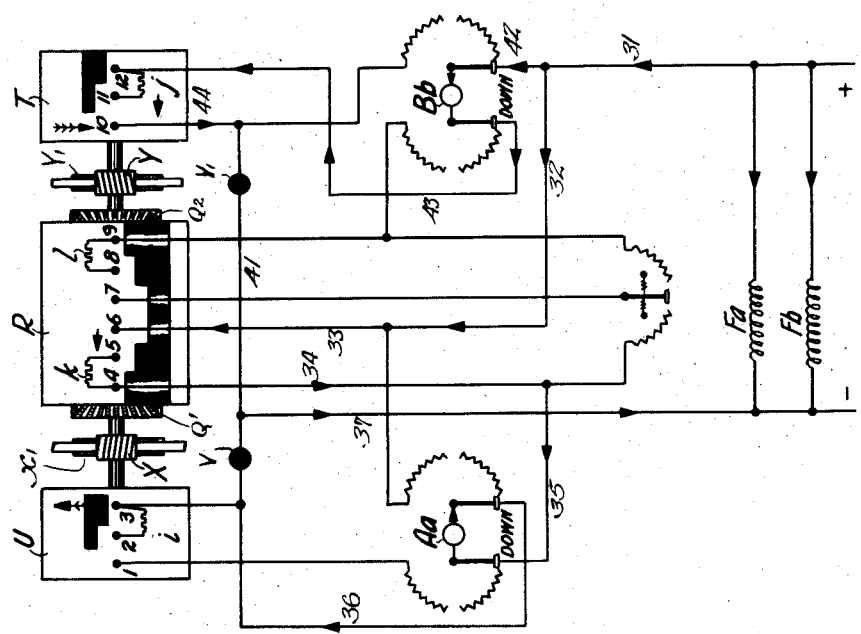
Fig. 5 is a schematic diagram of the operating circuits and their relation to the limit switches, developed in plan, when both the express and local elevators are moving down at full speed.

In Fig. 5 the motion of the local elevator is reversed, so that the current of its armature $Bb$, instead of passing through the differential control cylinder R as in Fig. 4, passes from the plus source over circuits 31 and 42, armature $Bb$, circuit 43 to contact 12 of the upper limit cylinder switch T, across the surface of the switch to contact 10, normally shunting the slow-down resistance $j$, and then by circuit 44, brake coil $V_1$ and circuits 41 and 37 back to the − source. As a result, the differential control cylinder R will remain stationary if the speeds of the cars are equal, or will have a variable movement in one direction or the other at less than half angular velocity, depending upon the relative speeds and directions of movement of the elevators.

Should either elevator be at stop the differential control cylinder will stop the movement of the other elevator at the predetermined distance, as well as open its own approach circuit.

Figure 6:
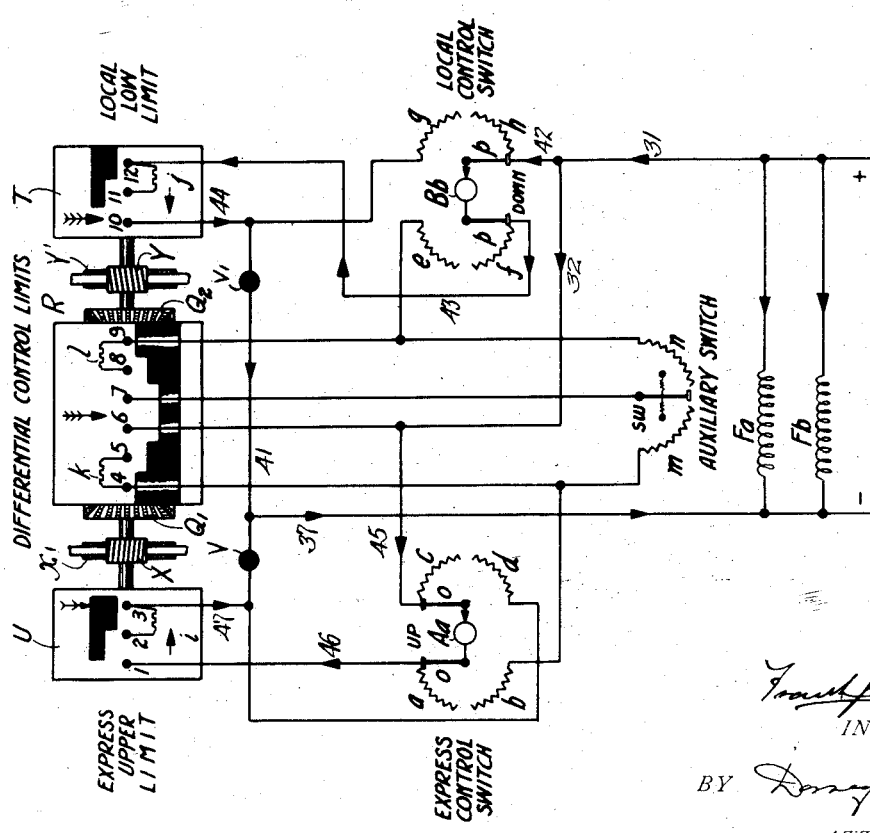
Fig. 6 is a schematic diagram of the operating circuits and their relation to the limit switches, developed in plan, when the express elevator is moving up and the local elevator is moving down, that is, away from each other, and at full speed.

In Fig. 6 the circuits are set so that the express elevator is moving up and the local elevator down, and the active circuits of neither pass through the differential control cylinder R but each passes through the respective fixed limit switches U and T.

Here the circuit of the local elevator motor remains the same as shown and described in Fig. 5, but the current of the express elevator motor flows from the plus source via circuits 31, 32 and 45, armature $Aa$ in a reversed direction to that shown in Figs. 3 and 4, circuit 46 to contact 1 on the upper limit control cylinder switch U, thence across its surface to contact 3, and through circuit 47, brake coil V and circuit 37 to the minus source.

As a result, the differential control cylinder R will move at a velocity varying from half to full rate away from the contact breaking position, and neither shiftable limit will be operated, although each car will be under final control of its fixed limit.

In Fig. 7 the circuits are such that the express and local elevators are both moving up, but now, while the circuit of the upper or express elevator passes through its upper limit U, and not at all through the contacts of the differential cylinder R, the up circuit of the local elevator does pass through the differential cylinder contacts. Here the circuit of the express elevator motor remains the same as shown and described in Fig. 6, while the circuit of the local elevator motor is the same as shown and described in Fig. 4,—that is, from plus source via circuits 31, 32 and 33, contacts 6 and 9, circuits 38, 39, armature $B^b$, circuit 40, brake coil $V_1$, circuits 41 and 37 to negative source. So long as the speed of the elevators is the same the differential cylinder will remain stationary, but if the local elevator overhauls the express, whether because the latter is stopped or because it is moving more slowly, then when the predetermined distance between the elevators is reached the local elevator will stop.

We have, therefore, a differential control member whose angular velocity, and limit and direction of movement, is the resultant of two variably speeded reversible driving members, each individual to its own elevator, with means jointly operated by them to modify and interrupt the down circuit of the upper elevator and the up circuit of the lower one, to insure slowing down and stopping each elevator when the limit of the approach distance between them is reached.

The position of the differential control cylinder R with reference to the two driving members determines the limiting approach operating distance of the two elevators. Hence, by turning the shell R one way or other about its supporting floating gear frame the limiting distance may be changed at will without changing the fixed upper limit of the express elevator, or the fixed lower limit of the local elevator.

A supplemental control is effected by switch $Sw$, which may complete the circuit of the armature of either elevator motor, through resistance $m$ or $n$, so that they can be brought slowly together more closely than may be perhaps permitted by the normal car control, this secondary or additional control being manipulated either within a car by the operator or without by the starter.

The circuits indicated and the actual method of controlling the motors by resistances directly varied by controls in each car is operative, but it is to be understood that any of the usual methods of distant control, as evidenced, among others, in Sprague multiple-unit Patent No. 660,065, as well as in other published patents and in current practice, may be used, such as the master control of unit resistances located at or near the elevator machinery, or resistances controlled by a solenoid or pilot motor, or by a variable potential control from a generator whose field strength is varied; and, of course, any combination of these with automatic stopping of elevators or for automatically making small movements for floor levelling purposes.

Referring to Figs. 8–14: These may be taken as representing, say, a 30-story building, with the express elevator $Xp$ starting from the main floor, and the local elevator $Lp$ starting from the basement or sub-basement, operating in different locations and directions over a cycle of a complete up and down trip for each elevator.

In Fig. 8 the express elevator is shown at the main floor ready for loading and the local elevator in the basement waiting for the express elevator to move out of the way.

In Fig. 9 the express elevator has gone to its first stop at, say, the 18th floor, and the local elevator has run up from the basement to the main floor where it has loaded and and is ready to start.

In Fig. 10 the express elevator has gone on making its local stops until it has reached its upper limit at the 30th floor, and, meanwhile, the local elevator has gone on making whatever stops are necessary and has arrived at the 18th floor, an arbitrary limit of its service, but one which may be changed at will.

In Fig. 11 both elevators are shown making down trips, with local stops in their respective zones, the express, for example, being at the 27th floor and the local at the 15th.

In Fig. 12 the local has stopped at the 12th, and the express has overhauled it at the 15th and has been stopped at the predetermined zone distance of three floors.

In Fig. 13 the local elevator has resumed its way and is passing, or has stopped at, the 8th floor, while the express elevator has followed the local at the floating distance and is abreast of, or has stopped at, the 11th floor.

In Fig. 14 the elevators are shown the same distance apart, the local having made its lower limit in the basement and the express having reached the 3rd floor on the way down.

The automatic slowing down and stopping has thus far been under normal control, but, as has been explained with reference to Figs. 4–7, the two elevators may now, through an extra control provision, be brought closer together, either from within the cars, or from outside by the starter, and the position of starting shown in Fig. 8 be re-established.

Without unduly limiting the scope of my invention, what I claim as new and desire to secure by Letters Patent is:

1. In a control system for two independent reversible motors, the combination of manually operated controllers for each of the motors and a supplemental automatically operated controller for one only of the two direction controlling circuits of each of the motors, said controller comprising a reversible floating member controlling said circuits by means of a revolvable spider having gears mounted so as to freely rotate about its radial axes, and gears on each side of and engaging the spider gears independently driven by the two motors.

2. In a control system for two independent reversible motors, the combination of manually operated controllers for each of the motors and a supplemental automatically operated controller for one only of the two direction circuits of each of the motors, said controller comprising a revolvable and reversible central member controlling said circuits, and driving gears in engagement with independently and reversibly driven gears on each side thereof, the central member having a differential motion in either direction varying in rate from nothing to a maximum according to the rate and direction of movement of the driving gears.

3. In a controlling system for two independent reversible motors, the combination of manually operated controllers for each of the two motors, and a supplemental automatically operated controller for one only of the two direction circuits of each of the motors, said controller comprising three members having a common axial center of rotation, the two outer members being mitre or bevel gears independently driven by the two motors at variable speeds in either direction and in mesh with freely turning gears on a spider carrying an intermediate circuit controlling member, this latter member having a differential motion in either direction variable in rate and displacement according to the direction and rate of motion of the two driving gears.

4. In a controlling system for two independent reversible motors, the combination of manually operated controllers for each of the motors and a supplemental automatically operated controller for one only of the two direction circuits of each of the motors, said controller comprising a differential member having a reversible movement varying in limit, direction and rate according to the amount, direction and rate of movement of each of two independently driven members in connection therewith.

5. In a dual elevator system, the combination of two elevators operating in a common shaft, each elevator having in addition to an extreme limit of travel in one direction a floating limit of travel in the opposite direction, the floating limits of the two elevators being simultaneously determined for both of the elevators by a supplemental controller situated at the head of the shaft and differentially operated by movement of the two elevators.

6. In a dual elevator system comprising two elevators operating in a common shaft, means operated by each elevator for causing both the elevators to slow down and stop when either approaches the other within a predetermined distance, said means comprising a supplemental controller situated at the head of the shaft and differentially operated to control the approach circuits only by movement of the two elevators.

7. In a dual elevator system comprising two elevators operating in a common shaft, one above the other, the combination of means for governing the up movement of the lower elevator and the down movement of the upper elevator, and means for interrupting the operation of the first-mentioned means whenever the elevators approach each other within a predetermined distance, said means comprising a supplemental controller situated at the head of the shaft and differentially operated to control the approach circuits only by movement of the two elevators.

8. In a dual elevator system comprising two elevators operating in a common shaft, one above the other, the combination of means for governing the up movement of the lower elevator and the down movement of the upper elevator, and means for interrupting the operation of the first-mentioned means whenever the elevators approach each other within a predetermined distance, said latter means comprising a supplemental controller situated at the head of the shaft and differentially operated to control the approach circuits only by movement of the two elevators, and means for changing the predetermined distance.

9. In a dual elevator system comprising two elevators operating in a common shaft, the combination of individual controllers for each elevator and a floating or differential control limit controller for each elevator operated jointly and simultaneously by the movement of mechanism synchronously with the movement of the two elevator cars.

10. In a dual elevator system comprising two elevators operating in a common shaft, a floating or differential control limit for each elevator controlled by the movement of a mechanism synchronous with the movement of one of the elevators when the other is stopped.

11. In a dual elevator system comprising two elevators operating in a common shaft, a floating or differential control limit for each elevator operated jointly by the movement of mechanism operating synchronously with the movement of either elevator when one elevator is overhauling the other.

12. In a dual elevator system comprising two elevators operating in a common shaft, a floating or differential control limit for each elevator operated jointly by a mechanism whose primary movements are synchronous with the motion of each elevator, to establish approach limits regardless of location of said approach in relation to the different floor levels.

13. In a dual elevator system comprising two elevators operating in a common shaft, a floating or differential control limit operated by mechanisms whose primary movements are synchronous with the movement of each elevator, which control limit mechanism will move in the same direction towards slow-down and stop for a down movement of the upper elevator or an up movement of the lower elevator.

14. In a dual elevator system comprising two elevators operating in a common shaft, a floating or differential control limit operated by independent mechanisms whose primary movements are synchronous with the movement of each elevator, which differential has a resultant movement varying in direction, rate and limit according to the direction and rates of movement of the two elevators.

15. In a dual elevator system the combination of two cars operating on common rails in a single shaft and a supplemental controller at the head of the shaft for the down control circuit of the upper car and the up control circuit of the lower car, carried through a differentially operated member operated by two gears each of which is driven by its associated motor.

16. In a dual elevator system comprising two cars operating on common rails in a single shaft, the combination of controlling circuits for the movement of both cars so connected as to insure the slowing down and stopping of either or both cars when brought within a predetermined distance of each other through the medium of a differential circuit controller reversibly driven by independent mechanisms moving in synchronism with the two elevators; and a supplemental manually operated control permitting the two cars to be brought nearer to each other.

17. In a system of control for two independent reversible motors, the combination of a manual controller for each of the motors and a supplemental controller comprising a floating member controlling one each of two direction controlling circuits of the two motors, said member being movable in variable amount, rate and direction by two connected gears each of which is driven in synchronism with one of the motors and its motor load.

18. In a dual system of elevator control, the combination of two independent reversible motors situated at the head of a shaft each connected to an elevator car, a manually operated controller for each motor in its respective car, and an automatically operated supplemental controller for controlling one only of the two direction circuits of each motor, said controller comprising a differential member in constant engagement with and driven by two connected members each operated in synchronism with a motor load.

19. In a system of motor control for a dual system of elevators, the combination of independent manually operated controllers for each elevator motor and a supplemental limiting and automatically operated controller at the head of the shaft for the down circuit of the upper elevator and the up circuit of the lower elevator, said controller being operated to a position of simultaneous control of both circuits when the cars are brought within a definite distance of each other, regardless of the method or direction of approach.

20. In a system of control for two elevator motors located at the head of a shaft and operating two cars one above the other in the same shaft, a differential limiting controller comprising means operated by the up movement of the lower elevator and the down movement of the upper elevator to simultaneously open the circuits corresponding to said movements while leaving undisturbed the circuits controlling the opposite movements.

21. In a system of dual motor control, the combination of two reversibly driven motors, each connected to an independent load, an independent car controller for both speed and direction for each motor, and a common limiting controller comprising two parts each reversibly and independently driven in synchronism with a motor load, and another part differentially driven by the aforesaid parts and including one only of the two directing controlling circuits of each of the two motors.

22. In a system of motor control, the combination of two reversibly driven motors, each connected to an independent load, and a common limiting controller comprising two parts one of which is reversibly and independently driven in synchronism with one motor load, and the other similarly driven in synchronism with the other motor load, and another part differentially driven by the aforesaid controller parts and including one only of the two direction controlling circuits of each of the two motors.

23. In a dual elevator system, the combination of two elevators operated one above the other on common rails in a single shaft, the upper elevator having center limiting cable suspension and the lower one a divided side cable suspension, and free counterweights for each elevator moved on common rails at the same speed as the elevators, the upper counterweight being attached to the side cables of the lower elevator and the lower counterweight being attached to the center cable of the express elevator.

24. In a control system for two elevators reciprocally operated in a common shaft, the combination of independent manually operated car controllers for each elevator and an external control mechanism for both elevators whose circuits are partially interlocked with those of the manual controllers and is automatically operated in synchronism with the movement of either elevators to simultaneously modify and interrupt the approach circuits of each elevator without affecting the circuits controlling the movements of the elevators away from each other.

25. In a multiple elevator control system, a plurality of elevators independently operable in a common shaft, separate driving means moving for each elevator up and down in said shaft, and means located adjacent said driving means and operable differentially in correspondence with movements of both of said elevators for stopping said elevators when they approach within a predetermined distance of each other while permitting freedom of movement of either elevator in either direction when said elevators are more than said distance apart.

26. In a multiple elevator control system, a plurality of elevator cars independently operable in a common shaft, separate multi-speed driving means for moving each of said cars up and down in said shaft, and means operable differentially in correspondence with the combined movements of said cars for reducing the speed of any of said cars when said cars approach within one predetermined distance of another, and for stopping any of said cars when said cars approach within a lesser distance of each other.

27. In a multiple elevator control system, a plurality of elevator cars independently operable in a common shaft, separate multi-speed driving means for moving each of said cars up and down in said shaft, and means operable differentially in correspondence with the combined movements of said cars for reducing the speed of any of said cars when said cars approach within one predetermined distance of another, and for stopping any of said cars when said cars approach within a lesser distance of each other, and manually operable means for permitting said cars to approach each other within said last named distance but only at low speed, and means actuated by said differentially operated means for limiting the distance of approach under the control of said manually operable means.

In testimony whereof I have hereunto signed my name, New York, December 30, 1926.

FRANK J. SPRAGUE.